United States Patent
Wilson et al.

(10) Patent No.: US 6,398,319 B1
(45) Date of Patent: Jun. 4, 2002

(54) DRIVER WARNING OF BRAKING MALFUNCTION IN ELECTRO-HYDRAULIC (EHB) BRAKING SYSTEMS

(75) Inventors: James Henton Wilson, Coventry; Peter Martin, Sutton Coldfield, both of (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/474,612

(22) Filed: Dec. 29, 1999

(30) Foreign Application Priority Data

Dec. 31, 1998 (GB) ............................................. 9828825

(51) Int. Cl.$^7$ ................................................ B60T 8/88
(52) U.S. Cl. ............................ 303/122.03; 303/122.05; 303/122.08
(58) Field of Search ............................ 303/122, 122.03, 303/122.04, 122.05, 122.09, 122.11, 122.08

(56) References Cited

U.S. PATENT DOCUMENTS

| | | | |
|---|---|---|---|
| 3,658,389 A | * | 4/1972 | Okamoto et al. ...... 303/122.05 |
| 4,655,511 A | * | 4/1987 | Leiber ................... 303/122.11 |
| 4,708,225 A | | 11/1987 | Feldman et al. ....... 303/DIG. 4 |
| 4,776,643 A | * | 10/1988 | Leiber ................... 303/122.11 |
| 4,861,117 A | | 8/1989 | Reinartz et al. |
| 4,964,679 A | | 10/1990 | Rath ......................... 303/146 |
| 5,004,299 A | | 4/1991 | Brearley et al. ....... 303/DIG. 4 |
| 5,125,483 A | | 6/1992 | Kitagawa et al. |
| 5,302,008 A | | 4/1994 | Miyake et al. |
| 5,611,606 A | | 3/1997 | Nell et al. |
| 5,649,749 A | * | 7/1997 | Kullmann et al. ..... 303/122.04 |
| 5,722,744 A | * | 3/1998 | Kupfer et al. ........... 303/115.2 |
| 6,161,904 A | * | 12/2000 | Schmidt et al. ........ 303/122.04 |

FOREIGN PATENT DOCUMENTS

| | | |
|---|---|---|
| DE | 44 25 477 A1 | 1/1996 |
| DE | 195 10 522 A1 | 9/1996 |
| DE | 195 43 582 A1 | 6/1997 |
| WO | WO 98/39184 A1 | 9/1998 |

OTHER PUBLICATIONS

Jonner et al., Electrohydraulic Brake System—The First Approach to Brake–By–Wire Technology, SAE Technical Paper Series No. 960991, International Congress & Exposition, Detroit, Michigan Feb. 26–29, 1996, pp. 105–112.*

* cited by examiner

Primary Examiner—Paul N. Dickson
Assistant Examiner—Thomas J. Williams

(57) ABSTRACT

An electro-hydraulic braking system of the type capable of operating in a brake-by-wire mode wherein hydraulic pressure is applied to braking devices at the vehicle wheels in proportion to the driver's braking demand as sensed electronically at a brake pedal, wherein when it is detected that there exists within the system a prescribed category of non safety-critical fault, it is arranged that the driver is caused to experience a modified, different to usual, travel/force behaviour characteristic through the braking pedal when braking.

3 Claims, 3 Drawing Sheets

DRIVER WARNING OF BRAKING MALFUNCTION IN ELECTRO-HYDRAULIC (EHB) BRAKING SYSTEMS

CROSS-REFERENCE TO RELATED APPLICATIONS

This application claims priority to co-pending United Kingdom Patent Application No.9828825.1

BACKGROUND OF THE INVENTION

The present invention is concerned with providing the driver of a vehicle fitted with an electro-hydraulic braking system with a warning of the existence of a braking malfunction condition.

A typical EHB system for a vehicle comprises a brake pedal, respective braking devices connected to the vehicle wheels and which are capable of being brought into communication with electronically controlled proportional control valves in order to apply hydraulic fluid under pressure to the braking devices, a hydraulic pump driven by an electric motor, and a high pressure hydraulic pressure accumulator fed by said pump for the provision of hydraulic fluid under pressure which can be passed to the braking devices via the proportional control valves in order to apply hydraulic fluid under pressure to the braking devices in so called "brake by wire" mode in proportion to the driver's braking demand as sensed at the brake pedal. The EHB system is controlled by an electronic controller (ECU).

In order to make the EHB system "feel" like a conventional braking system, a travel simulator is also provided which is connected hydraulically to a master cylinder coupled to the brake pedal and which allows, by increasing the volume under pressure, the brake pedal to be depressed to an extent comparable with that of conventional systems. In the event of failure of the brake-by-wire mode, the system can adopt a so-called "push-through" mode in which at least the front brakes are controlled directly from the latter master cylinder. In this mode of braking, it is usual to isolate the travel simulator by the closure of an electronically operated valve, in order to reduce the pedal travel required to apply the desired braking pressure.

A problem with known EHB systems is that they can continue to operate with the existence of a (non-critical) fault condition but without the driver feeling any difference in the pedal behaviour and therefore being unable to detect the fault condition by any change in the "feel" of the system. In such cases, the normal approach is to illuminate a dashboard warning lamp. However, this may not be noticed by the driver or, it may be noticed, but ignored because its significance is not appreciated.

In accordance with the present invention, it is arranged that, if such a (non-critical) fault condition arises, the driver is caused to experience a different to usual travel/force behaviour characteristic through the braking pedal when braking. Thus, for example, the driver can experience a different-to-usual braking effect for a given pedal depression. This provides optimum feedback as the driver will have his attention focused on such a different (unusual) pedal behaviour.

In one embodiment, the modified travel/force behaviour characteristic can be arranged to give the driver a lower deceleration of the vehicle than usual for a given pedal travel, so that the driver has to press the brake pedal harder than usual.

In another embodiment, the modified travel/force behaviour characteristic can be arranged to give the driver a greater deceleration of the vehicle than usual for a given pedal travel, so that the driver has to press the brake pedal less hard than usual.

In the latter case, the driver can also be arranged to experience a strong brakes "jump-in" in the initial range of pedal travel.

In a still further embodiment, the modified travel/force behaviour characteristic can be arranged deliberately to induce oscillations in the brake pressure so as to create audible noise and/or vibrations in the vehicle chassis to produce driver discomfort. The level of discomfort can be arranged to be increased if the fault continues to be ignored over time.

Preferably, the modified travel/force behaviour characteristic is constrained to lie within a boundary limited by the maximum pedal travel ($S_{max}$) and maximum braking pressure ($P_{max}$) allowable by the system under normal braking conditions.

The responsibility for changing the pedal behaviour in dependence on a fault condition can be borne by a control logic which can be implemented in the electronic control unit(s) of the system. This has the advantage that an intervention in the system hardware is not required. Generally, the modified characteristic would not be obtained by alteration of the pedal simulator circuit, although it could in principle, but is achieved rather by modified control of actuating valves/solenoids by the CPU within the system which determines the overall braking effect for a given pedal displacement, including for example the proportional solenoid control valves 14.

The invention is described further hereinafter, by way of example only, with reference to the accompanying drawings.

DETAILED DESCRIPTION OF THE INVENTION

Figure 1:
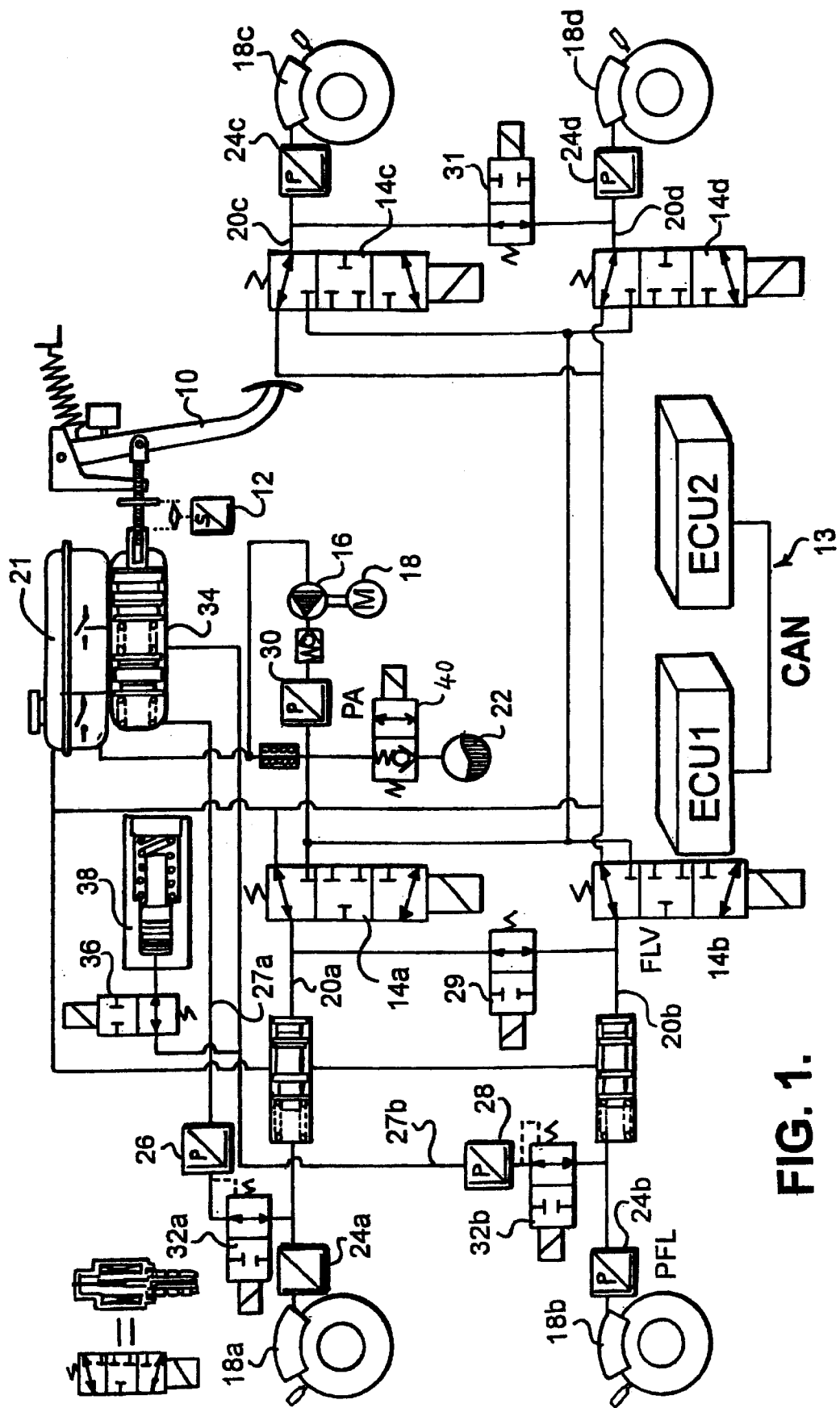
FIG. 1 is a schematic illustration of one embodiment of an electro-hydraulic braking system to which the present invention is applicable.

Referring first to FIG. 1, the illustrated EHB system comprises a brake pedal 10 with an associated sensor 12 for the acquisition of the driver's braking demand. The driver's demand is transferred to an electronic control unit (ECU1/ECU2) 13, evaluated there, and used as the source for the generation of electrical control signals for proportional solenoid control valves 14a, 14b, 14c, 14d, a hydraulic pump 16, wheel brakes 18a, 18b of one axle supplied with hydraulic fluid by electrically actuated brake channels 20a, 20b and wheel brakes 18c, 18d of the other axle supplied by electrically actuated channels 20c, 20d. Hydraulic fluid for the system is stored in a reservoir 21.

Under normal braking conditions, brake pressure modulation in the electrically actuated brake channels 20a, 20b, 20c, 20d is effected in a known ("brake-by-wire") manner by means of the proportional solenoid control valves 14a, 14b, 14c and 14d, the brake pressure being provided by a pressure accumulator/reservoir 22 whose pressure is maintained by the pump 16 operated by an electric motor 18. The accumulator/reservoir 22 can be selectively isolated by a solenoid operated valve 40.

Pressure sensors 24a and 24b monitor the hydraulic pressure at the wheel brakes 18a, 18b of the front axle and pressure sensors 24c and 24d monitor the hydraulic pressure at the wheel brakes 18c, 18d of rear axle. Further pressure sensors 26, 28 monitor the pressure within push-through circuits 27a, 27b for the right and left front wheel brakes and a pressure sensor 30 monitors the supply pressure in the circuit of pump 16. Respective solenoids 29 and 31 enable the brake channels 20a, 20b and 20c, 20d to be coupled together.

The push-through circuits 27a, 27b include respective solenoid controlled valves 32a, 32b to enable these circuits to be closed (open-circuited) during normal brake-by-wire operation.

The push-through arrangement includes a master-cylinder 34 coupled to the brake pedal 10 and to the circuits 27a, 27b, the master cylinder enabling the front brakes to be actuated manually in the event of failure of the brake-by-wire system. Coupled to the circuit 27b via a solenoid operated valve 36 is a travel simulator 38 which is activated hydraulically by master-cylinder pressure to give "feel" to the driver during operation of the brakes in brake-by-wire mode. The connection between the master cylinder 34 and the travel simulator 38 is controllable by the electrically operated valve 36, so that unnecessary pedal travel can be avoided during manual actuation by closure of this valve.

The EHB system described this far is already known. In operation, the system is controlled by means of the electronic control units ECU1 and ECU2 which are in communication via a CAN bus. The travel s and/or force F resulting from an actuation of the brake pedal 10 is/are sensed by the sensor means 12.

Furthermore, the brake pressure p which, on an actuation of the brake pedal, is generated in the master cylinder 34, is sensed by the sensor means 26, 28. In the EHB braking mode, that is when there is no safety-critical fault condition in the system, valves 32a, 32b are closed and the valve 36 is opened so that, on an actuation of the brake pedal 10, the pedal simulator 38 is actuated for giving the driver a similar pedal feel as on a conventional braking system. On an actuation of the brake pedal 10, the signals from the sensor means 12, 26, 28 are evaluated within the electronic control unit(s) to determine the driver's braking demand. The electronic control unit(s) control(s) the valves 14a to 14d, valve 40 and the pump unit 16, 18 for modulating the brake pressure in the wheel brakes 18a to 18d in dependence on the driver's braking demand. For closed loop control operations, the brake pressure in the wheel brakes 18a to 18d is sensed by the sensor means 24a to 24d in each case.

Figure 2:
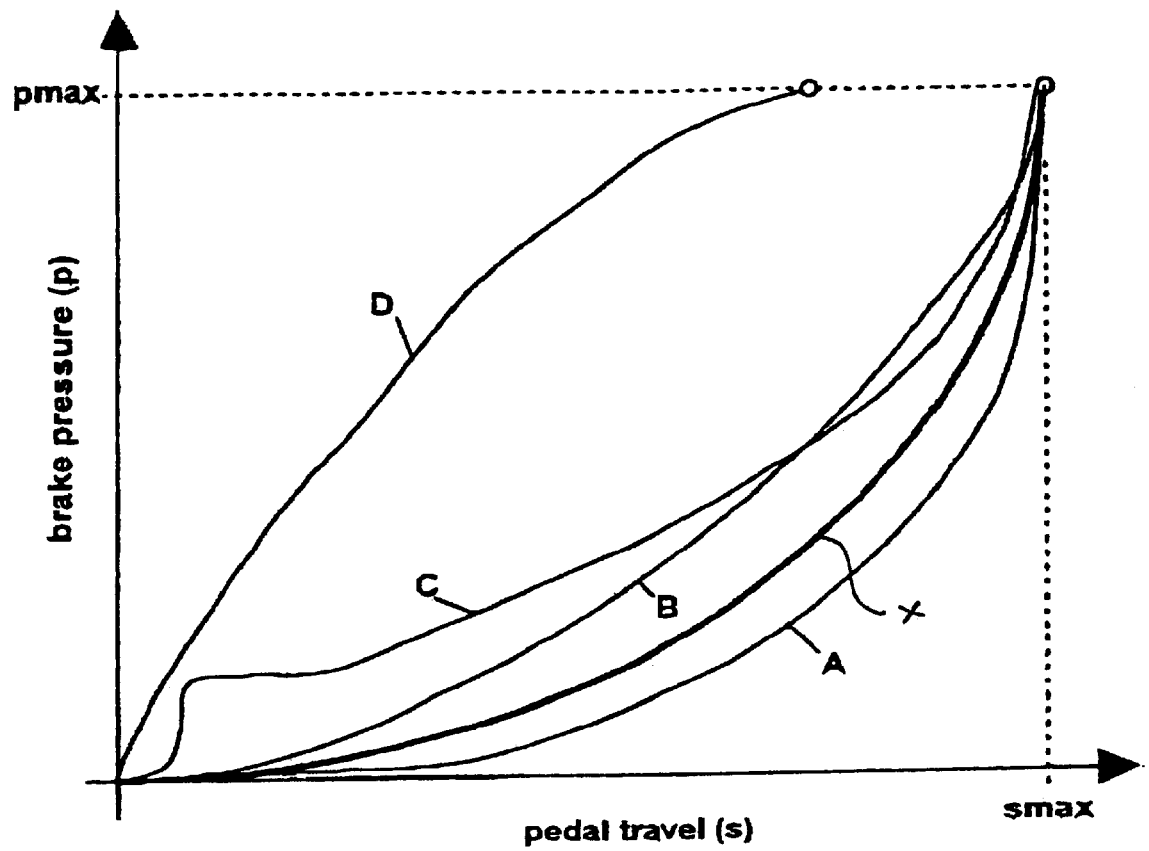
FIG. 2 is a set of curves of brake pressure (p) over pedal travel (s) showing a number of different pedal behaviours.

FIG. 2 shows a series of brake pressure (p) versus pedal travel (s) characteristic curves for different pedal behaviours. The thicker curve X represents the (normal) pedal characteristic when there is no fault condition in the system. Starting from the origin point of the axis system, the curve X increases progressively until reaching the maximum point $S_{max}/P_{max}$, where $S_{max}$ is the maximum possible pedal travel and $P_{max}$ is the corresponding maximum brake pressure.

In accordance with the present system, on a (non-critical) fault condition arising within the system, any one of a plurality of possible pedal behaviours can be generated by the electronic control unit(s) within the range of the rectangle defined by $S_{max}$ and $P_{max}$ in accordance with control techniques, well known per se.

However, in all cases it should be guaranteed that the maximum brake pressure can be reached.

Four preferred embodiments of possible modified pedal behaviours are illustrated by the curves A to D in FIG. 2.

1. Curve A gives the driver the feeling of a so-called "long pedal". It runs continuously below the thick curve X and rises steeply in the end range of the pedal travel to meet the criteria of reaching the maximum point $S_{max}/P_{max}$. According to this behaviour, the driver will notice a lower deceleration of the vehicle than usual, so he has to step on the brake pedal more. Also, he has to put a greater force on the brake pedal, for reaching the desired deceleration.

2. Curve B gives the driver the feeling of a so-called "short pedal". It runs continuously above the thick curve X and rises less steeply in the end range of the pedal travel to end in the maximum point $S_{max}/P_{max}$. According to this behaviour, the driver will notice a greater deceleration of the vehicle than usual, so he has to reduce the brake pedal actuation for achieving the desired deceleration.

3. Curve C also gives the driver the feeling of a "short pedal" but it has additionally a strong "jump-in" in the initial range of the pedal travel. This will produce a pitching motion of the vehicle when actuating the brake pedal which is not comfortable for the driver and which causes him to go to a garage for checking the braking system.

4. Curve D gives the driver the feeling of a "very short pedal". It produces a very high deceleration of the vehicle and also shortens the pedal travel since the maximum point $S_{max}/P_{max}$ is shifted nearer to the brake pressure (p) axis.

The flexibility that any pedal behaviour can be generated within the range of the rectangle defined by $S_{max}$ and $P_{max}$ allows different fault conditions to be categorised with different pedal behaviours.

The above described invention is concerned only with fault conditions which are not safety critical and in which the EHB braking mode can be maintained. For example this could be a fault of one pressure sensor means 26 or 28, which are redundant. In safety-critical fault conditions which occur for example on a breakdown of the electric power supply, the system is arranged to be switched into the already known so-called "push-through" mode by opening the valves 32a, 32b and closing valve 36 so that the pressure generated in the master cylinder 34 directly hydraulically acts on the wheel brakes 18a, 18b of one axle of the vehicle.

Figure 3:
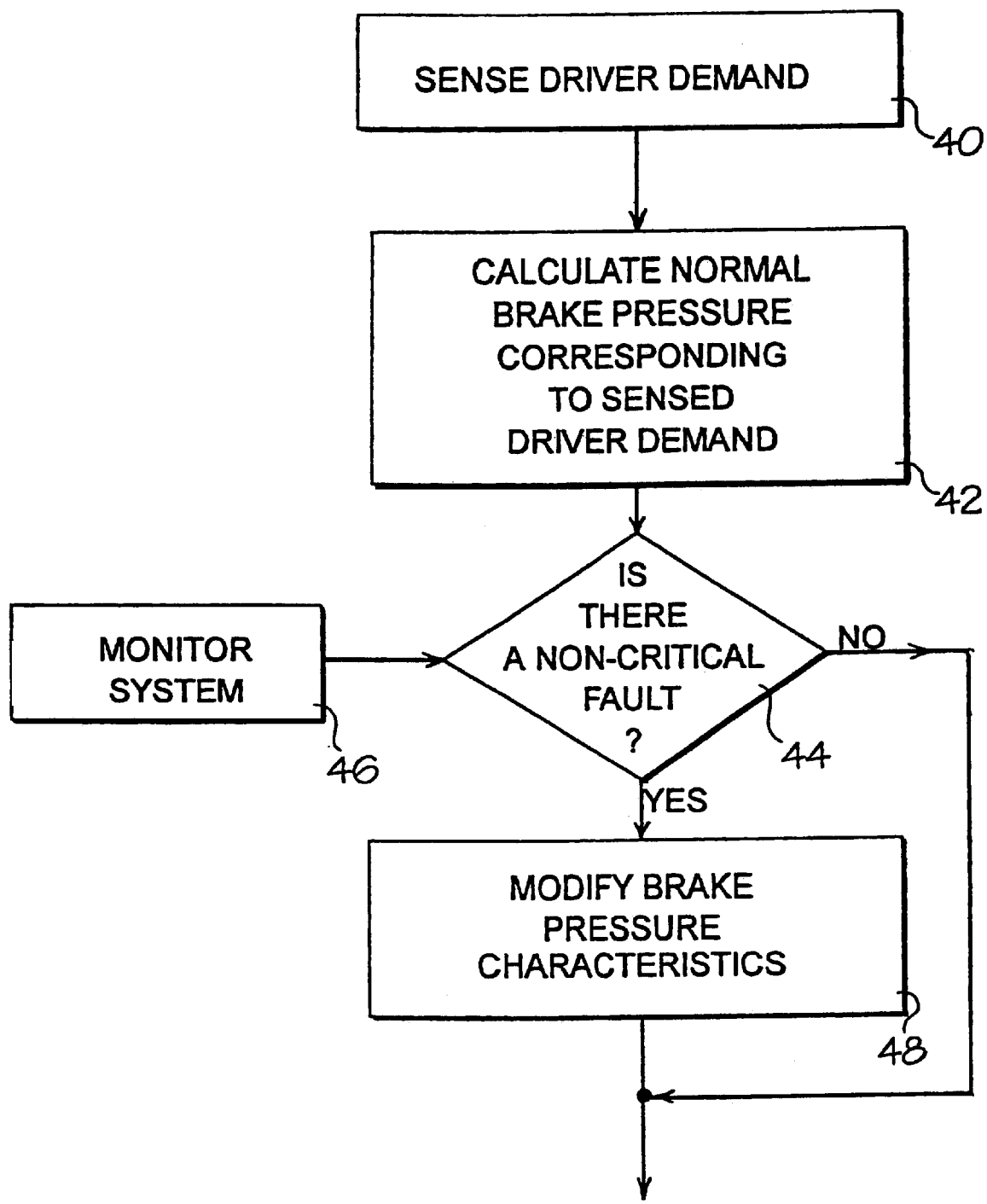
FIG. 3 is a simplified flow diagram of one embodiment of a system for achieving a control system in accordance with the present invention.

FIG. 3 is a flow diagram showing one possible system embodying the present invention. The driver demand resulting from a given pedal depression is sensed and noted at 40 and the "normal" brake pressure corresponding to that sensed driver demand is calculated at 42. Monitoring devices/means are included within the system as a whole to provide signals which can be checked to determine whether a fault exists within the system and whether this is a critical or non-critical fault. If a non-critical fault falling within a specified category is present, this is determined at 44. If there is such a fault, then a procedure is initiated at 48 to modify the brake pressure in accordance with a predetermined different-to-normal characteristic, such as one of those described hereinbefore, whereby the driver is caused to notice that, although it is still operating, something is abnormal in the braking system and that checks need to be made.

What is claimed is:

1. An electro-hydraulic braking system of the type capable of operation in a brake-by-wire mode wherein hydraulic pressure is applied to braking devices at the vehicle wheels in proportion to the driver's braking demand as sensed electronically at a brake pedal, and in a push-through mode wherein hydraulic pressure is applied to the braking devices at the vehicle wheels by way of a master cylinder coupled mechanically to the brake pedal, and which includes a hydraulic travel simulator which is connected hydraulically to said master cylinder for providing improved feel for the driver through the brake pedal in the brake-by-wire operation mode, wherein when it is detected that there exists within the system a prescribed category of non safety-critical fault, it is arranged that the driver is caused to experience a modified, different to usual, travel/force behavior characteristic through the braking pedal when braking, and wherein the modified travel/force behavior characteristic is achieved by deliberately inducing oscillations in the brake pressure so as to create at least one of audible noise and vibrations in the vehicle chassis.

2. A system according to claim 1, wherein the modified travel/force behavior characteristic is constrained to lie within a boundary limited by the maximum pedal travel ($S_{max}$) and maximum braking pressure ($P_{max}$) allowable by the system under normal braking conditions.

3. A system according to claim 1, wherein the modified travel/force behavior characteristic gives the driver any of a lower deceleration of the vehicle than usual for a given pedal travel, so that the driver has to press the brake pedal harder than usual, a greater deceleration of the vehicle than usual for a given pedal travel, so that the driver has to press the brake pedal less hard than usual, and an experience of deliberately induced oscillations in the brake pressure which will create at least one of audible noise and vibrations in the vehicle chassis.

* * * * *